United States Patent [19]
Füchter et al.

[11] Patent Number: 6,140,982
[45] Date of Patent: Oct. 31, 2000

[54] METHOD OF IDENTIFYING A TARGET AS A FRIEND OF FOE, AND ARRANGEMENT FOR EXECUTING THE METHOD

[75] Inventors: Norbert Füchter, Dellmensingen; Franz-Xaver Hofele, Donzdorf; Tiang-Gwan Liem, Ulm, all of Germany

[73] Assignee: DaimlerChrysler AG, Stuttgart, Germany

[21] Appl. No.: 09/276,914

[22] Filed: Mar. 26, 1999

[30]   Foreign Application Priority Data

Mar. 26, 1998   [DE]   Germany ................... 198 13 242

[51] Int. Cl.⁷ .................................................. G09G 3/12
[52] U.S. Cl. .................................................. 345/45
[58] Field of Search .................................................. 342/45

[56]   References Cited

U.S. PATENT DOCUMENTS

| | | | |
|---|---|---|---|
| 3,713,167 | 1/1973 | David | 343/797 |
| 3,715,750 | 2/1973 | Bishop | 342/51 |
| 4,143,263 | 3/1979 | Eichweber | 359/170 |
| 4,249,265 | 2/1981 | Coester | 455/604 |
| 4,918,458 | 4/1990 | Brunner et al. | 343/795 |
| 5,001,488 | 3/1991 | Joguet | 342/45 |
| 5,170,168 | 12/1992 | Roth | 342/45 |
| 5,231,413 | 7/1993 | Dubois | 343/833 |
| 5,382,957 | 1/1995 | Blume | 342/43 |
| 5,396,243 | 3/1995 | Jalink, Jr. et al. | 342/54 |
| 5,446,462 | 8/1995 | Cleveland | 342/45 |
| 5,648,862 | 7/1997 | Owen | 359/153 |
| 5,677,694 | 10/1997 | Chevalier et al. | 342/45 |
| 5,677,928 | 10/1997 | Rizzo et al. | 375/202 |
| 5,745,575 | 4/1998 | Otto et al. | 380/23 |
| 5,790,438 | 8/1998 | Simonnet | 364/579 |
| 5,796,362 | 8/1998 | Ayasli et al. | 342/6 |
| 5,819,164 | 10/1998 | Sun et al. | 455/106 |

*Primary Examiner*—John B. Sotomayor
*Attorney, Agent, or Firm*—Venable; Norman N. Kunitz

[57]   ABSTRACT

The invention relates to a system for identifying targets as a friend or foe, which is operated in the millimeter-wavelength range by means of an interrogator and a transponder, with the interrogator and the transponder having essentially the same electronic assemblies and operating in essentially the same middle transmitting and receiving frequency, and with a large frequency difference between the two being tolerable. The interrogator operates with a directional transmitting/receiving antenna, whereas the transponder possesses an omnidirectional transmitting/receiving antenna.

6 Claims, 1 Drawing Sheet

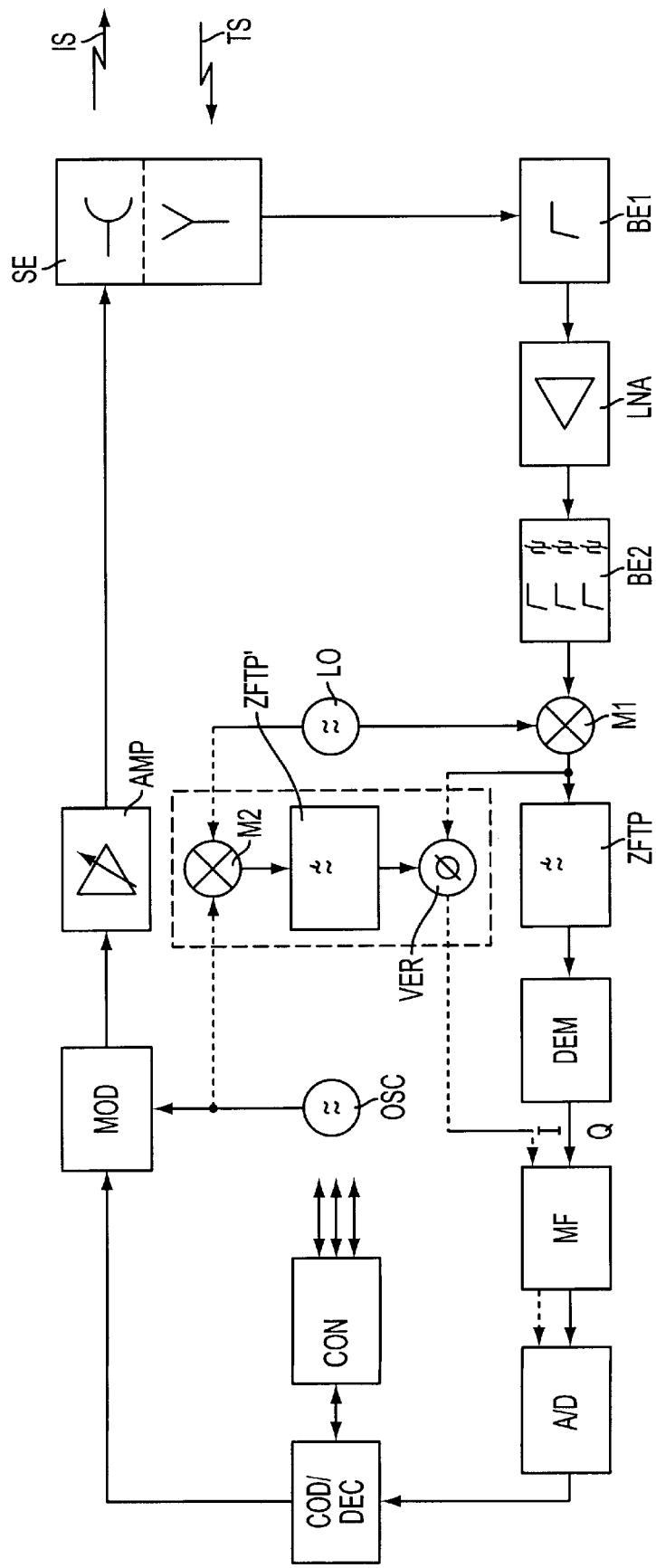
FIGURE

METHOD OF IDENTIFYING A TARGET AS A FRIEND OF FOE, AND ARRANGEMENT FOR EXECUTING THE METHOD

CROSS-REFERENCE TO RELATED APPLICATION

This application claims the priority of Patent Application Ser. No. 197 13 242.5 filed in Germany on Mar. 26, 1998, the subject matter of which is incorporated herein by reference.

BACKGROUND OF THE INVENTION

The present invention is based on a method of identifying a target as a friend or foe, the method comprising the following steps:

(1) An interrogator transmits a querying electromagnetic wave to a target to be identified, (2) Provided that the target to be identified possesses a transponder matched to the querying electromagnetic wave, the target receives the querying electromagnetic wave, if necessary, and the transponder transmits an electromagnetic wave in response, (3) The responding electromagnetic wave transmitted by the transponder is received and evaluated by the interrogator such that, if a predeterminable transponder response code is present, the associated target to be identified is classified as a friendly target.

The invention is further based on an arrangement for carrying out the method.

Particularly in the military field, but also in civilian applications, for example, for protecting large industrial sites or power stations, it is necessary to identify and/or classify targets need to be identified as friendly or threatening by using electromagnetic waves. In the Identification Friend/Foe (IFF) method, a querying transmitting/receiving arrangement (interrogator) transmits a querying electromagnetic wave, for example by means of a transmitting antenna. If the target is a friendly target, for example, a land, sea or air vehicle belonging to the same military force as the interrogator, the querying electromagnetic wave is received by a transponder on board the friendly target. The transponder then transmits a coded electromagnetic wave as a response. This wave is received and evaluated by the interrogator. The coding is used to decide whether the detected target is to be treated as a friendly target or a threatening or hostile target.

It is evident that, in particular, an interrogator can be detected, localized and attacked very early by a threatening target when the interrogator transmits the querying electromagnetic wave, especially a spatially-nondirectional wave. An obvious solution for avoiding this drawback is for the interrogator to transmit a spatially-directional, querying electromagnetic wave to a predeterminable and unknown target. This type of wave can only be received and evaluated by this target.

SUMMARY OF THE INVENTION

It is an object of the invention to provide a method that enables a interrogator/transponder system to function reliably and which avoids detection of the interrogator and an interference of its function. It is a further object of the present invention to provide an arrangement for carrying out the method.

With the above objects in view, the present invention resides in a method in which the interrogator transmits the querying electromagnetic wave in the millimeter-wavelength range, with a predeterminable, average wavelength, a predeterminable directional characteristic, a predeterminable maximum range and a predeterminable coding, directly to the target to be identified, wherein the querying electromagnetic wave is received by the transponder by means of a receiving antenna having an essentially non-directional receiving characteristic, wherein the responding electromagnetic wave is then transmitted essentially non-directionally and lies in the same millimeter-wavelength range as the querying electromagnetic wave. The responding electromagnetic wave transmitted by the transponder is received by the interrogator by means of a receiving antenna that is directed at the target to be identified and has a predeterminable directional receiving characteristic, and in the interrogator, the received responding electromagnetic wave is supplied to a first mixer by way of a first limiter, a low-noise preamplifier and a second limiter is then converted by the first mixer and a signal generated by a local oscillator (LO), with a predeterminable frequency, into a predeterminable intermediate-frequency range, and is then demodulated in a quadrature demodulator (DEM) after a predeterminable low-pass filtering (ZFTP), resulting in orthogonal signals in the video range. The orthogonal signals are converted into an analog signal by means of a matched filter matched to the coding of the responding wave, and subsequently converted into a digital signal by means of an analog/digital converter, and the digital signal is decoded by at least a decoder and a controller and evaluated such that it is possible to identify a target as a friend or foe based on the coding, The present invention further provides an arrangement in which essentially the same electronic assemblies are provided in the interrogator and the transponder and, with the interrogator and the transponder differ only in that the interrogator is provided with a directional transmitting/receiving antenna whereas the transponder possesses an omnidirectional transmitting/receiving antenna. In the transponder, the controller is configured so as to prevent a query mode.

One advantage of the invention is that, in the interrogator, at least the querying wave lies in the millimeter-wavelength (mmW) range. Such waves can be bundled well (spatially directed) and, furthermore, are insensitive to environmental influences, especially airborne substances such as fog, steam, smoke, rain and snow. Moreover, a predeterminable transmitting output can economically be used with millimeter waves, so a predeterminable, maximum range of the querying wave can be determined in advance.

Another advantage is that a high spatial resolution, e.g. about 100 m, is possible in a predeterminable distance range of the querying wave, for example within a range of 5 km to 10 km.

A third advantage is that a high identification probability, e.g. greater than 0.9, can be attained within a predeterminable, short time, for example within a second.

A fourth advantage is that both the interrogator and the transponder can be manufactured using mmW technology, because this allows the assemblies required by the interrogator to also be used in the transponder, resulting in the use of modular design.

A fifth advantage is that both the interrogator and the transponder can be manufactured to be spatially small and robust in an economical manner, particularly in industrial mass production, because of the mmW technology, which can be embodied in integrated technology.

A sixth advantage is that, during a self-identification process, all of the possible extrinsic queries and possible responding signals can even be processed in an electronically-disturbed environment.

A seventh advantage is that no frequency separation is necessary between the querying and responding signals. Therefore, measures that would otherwise be necessary for frequency stabilization and/or assuring long-term stability are not needed.

BRIEF DESCRIPTION OF THE DRAWINGS

These and other features and advantages of the invention will be further understood from the following detailed description of the preferred embodiments with reference to the accompanying drawing, in which the single FIGURE shows a block diagram of an arrangement is shown, which can be used for an interrogator or a transponder.

DETAILED DESCRIPTION OF THE PREFERRED EMBODIMENTS

The figure shows a block diagram of an interrogator, that is, an arrangement that can transmit a coded, querying millimeter wave and evaluate a correspondingly-coded response of a transponder. The interrogator has a modular design (constructed in modules), preferably completely in semiconductor technology, for example in so-called GaAs—MMIC technology. This allows the use of low transmitting power, for example a maximum of 1 Watt, so that the range of the querying wave (transmission range) is limited to a predeterminable value. A receiver located outside of this range cannot detect the interrogator. An interrogator of this nature can be manufactured to be mechanically robust and spatially small, for example having a volume of about one liter. If a few predeterminable modules (assemblies) are changed or omitted in such an interrogator, the result is a transponder that can transmit only a responding wave coded corresponding to a predeterminable transponder identification in response to a coded querying wave (transmitted by the interrogator).

The querying and responding waves preferably lie in the same wavelength range. The associated transmitted and/or received signals lie, for example, in a frequency range of about 35 GHz to 100 GHz at a predeterminable frequency or predeterminable frequency band. At least some of the modules described below need to be adapted to the selected transmitting/receiving frequencies, for example, through a correspondingly-selected conductor technology and/or the selection of integrated semiconductor circuits matched to these frequencies.

In the interrogator shown in the figure, the coded querying wave is generated by means of a preferably digital controller Con, which is connected, on the one hand, to a likewise digital coder/decoder Cod/Dec and, on the other hand, as represented by three arrows, to an evaluation and/or indicator unit (not shown) and, if needed, to a data-processing system or a cryptographic device by way of an interface. At least one predeterminable, digital code value, which is suitable for a friend/foe target identification, is generated by means of the controller Con and the coder Cod and applied to an input of a modulator Mod. An output signal of an oscillator Osc, which generates a carrier signal having a predeterminable frequency from the mentioned frequency range of 35 GHz to 100 GHz, is applied to the other modulator input. A frequency generator having a technically-simple design and only possessing a low frequency stability can advantageously be used for the oscillator Osc. At the output of the modulator Mod, which is designed in the manner of a ring-type modulator, for example, a signal that is binary phase-modulated corresponding to the code value is formed, the signal being applied to a transmitting/receiving antenna arrangement SE, which is matched to the selected, predeterminable transmitting/receiving frequencies, by way of an analog amplifier Amp, whose amplification can be set if needed, preferably electrically.

According to another advantageous feature of the present invention the transmitting/receiving antenna arrangement SE has a directional characteristic that can readily be predetermined, that is, the arrangement is embodied as a transmitting/receiving aerial antenna. For example, a transmitted signal IS (coded query wave) having a maximum cone angle of 10° can be transmitted. A tightly-bundled transmitted signal such as this can be aimed directly at a target to be identified, for example, a land, air or water vehicle, or a person having a transponder. Because of the directional effect, this transmitted signal cannot be received and evaluated by a target that may be in the vicinity of the target, which avoids a discovery of the interrogator.

If the selected target to be identified has a transponder, as will be explained in detail below, the transponder receives the transmitted signal IS of the interrogator and subsequently transmits a transponder signal TS, which is likewise coded and modulated. This signal is preferably in the same frequency range as the transmitted signal (of the interrogator). No frequency shift is required between the transmitted and received signals, either in the interrogator or in the transponder.

If the transmitted and received signals are present in the same frequency range, self-poling is possible; in other words, in the interrogator, a portion of the transmitted signal can be coupled into the received signal due to a reflection, for example, and evaluated there in an undesired manner. This self-poling is avoidable, as will be described in detail below. The transponder signal TS is now received by the interrogator by means of the same transmitting/receiving antenna arrangement SE, that is, also by the transmitting/receiving aerial antenna.

The transponder signal TS received in the interrogator now travels via a first (amplitude) limiter BE1, which is preferably constructed from passive components, to the (antenna) preamplifier LNA having the least-possible noise. The first (amplitude) limiter BE1 is so configured that a disturbance or even destruction of the downstream (antenna) preamplifier LNA is avoided, for example by the disturbing pulses superposed over the transponder signal, the pulses having a high peak power. The output signal of the (antenna) preamplifier LNA is now supplied to a second limiter BE2. This limiter has a predeterminable number of preferably identical (band-pass limiter) channels connected in parallel. These channels permit a predeterminable (frequency) filtering of the (transponder) signal, for example, corresponding to the anticipated spectrum to be evaluated, which is a function of the selected coding (of the transponder signal).

Depending on the anticipated, different amplitudes, which are likewise a function of the coding (of the transponder signal), a different amplitude limitation is effected in the channels, if needed. This type of frequency-selective, multichannel limitation permits a suppression of the influence of interfering signals generating, for example, a broadband, interfering frequency spectrum.

The analog output signals of the (filter) channels of the second limiter BE2 are combined (added) and supplied to an input of a first mixer M1. The output signal of a local oscillator LO, which is synchronized with the oscillator Osc, is applied to the other input of the first mixer M1. An intermediate-frequency signal is generated in a predeterminable intermediate-frequency range at the output of the first mixer M1. This signal is supplied to a quadrature demodulator Dem following (an intermediate-frequency) low-pass filtering in a filter ZFTP. Orthogonal signals I, Q are generated at the quadrature-demodulator output. These signals are filtered by a matched filter MF (a filter adapted to the coding of the transmitted signals of the transponder), so that an analog signal is formed at the transponder output, the signal containing the coding of the transponder signal TS. The output signal of the matched filter MF is now digitized by an analog/digital converter A/D and evaluated by the decoder Dec and the controller Con. At the output of the controller, a yes/no signal is formed, for example, which indicates whether the detected target is to be classified as a friendly target (yes signal) or a threatening target (no signal).

In the described arrangement, the transmitted signal transmitted by the interrogator may, under unfavorable conditions, be disadvantageously coupled into its own reception antenna and be evaluated in the aforementioned manner. The result is an interfering, so-called self-poling (self-test) effect. If necessary, this can be suppressed by a suppressor circuit, which is enclosed by a dashed line in the figure, and whose function will be described below. To avoid an intrinsic query, the output signals of the oscillator Osc and the local oscillator Lo are supplied to a second mixer M2, converted there into a predeterminable frequency range through a down-conversion, and filtered by a low-pass filter ZFTP'. The resulting output signal and the output signal of the first mixer M1 are respectively supplied to an input of a further demodulator Ver, for example, a phase demodulator. At the output of the demodulator, a completely-modulated signal is formed in the video range and, then supplied to the matched filter MF and the above-described evaluation circuit. With the decoder Dec and the controller Con, a determination can be made, for example, whether a coding that is to be allocated to the transmitted signal of the interrogator is present in the output signal of the first mixer M1. This coding, which corresponds to self-poling, can, if needed, be suppressed in the further evaluation. In addition or alternatively to this, the suppressor circuit can, during a query process, advantageously check whether the process is successful.

A transponder that is part of the system differs essentially from the described interrogator in that a transmitting/receiving antenna arrangement having an omnidirectional characteristic is used; in other words, the transponder can receive from and transmit in virtually all directions. Furthermore, the transponder need only transmit a coded transponder signal TS associated with the transponder in response to a transmitted signal received and subsequently decoded by the transponder. This process is executed by the coder Cod and the controller Con, which is embodied, for example, as a digital microprocessor.

The interrogator/transponder system is Doppler-tolerant, that is, it can also be used for moved interrogators and/or transponders; the selected coding can virtually be disregarded.

Furthermore, the interrogator/transponder system makes it possible to use DBPSK (Differential Binary Phase-Shift Keying) modulation and a demodulation method matched thereto. These processes make possible a predeterminable, high system bandwidth, so that a spread-spectrum technique can be used. An advantage of this technique is that it is especially insensitive to inadvertent and/or deliberate interferences, such as so-called pulse interferences, narrowband continuous-wave interferences and/or broadband noise interferences and fruits, garbling and/or multiple-reflection interferences.

The aforementioned high identification probability, for example greater than 0.9, that can be attained within a predeterminable, short time, such as within one second, depends on the selected coding and how often a query signal of the interrogator and/or a transponder response signal is or are repeated and evaluated.

It will be understood that the above description of the present invention is susceptible to various modifications, changes and adaptations, and the same are intended to be comprehended within the meaning and range of equivalents of the appended claims. For example, the transmitting/receiving antenna arrangement in the interrogator may be a mechanically-rotating arrangement, or an arrangement having an omnidirectional characteristic. Furthermore, the transmitting/receiving antennas can be separate arrangements, so that, for example, signals polarized in a predeterminable manner can be transmitted and/or received and evaluated.

What is claimed is:

1. A method of identifying a target as a friend or foe, wherein:

(a) a querying electromagnetic wave is transmitted to a target to be identified by an interrogator, (b) provided that the target to be identified a transponder matched to the querying electromagnetic wave, the target receives the querying electromagnetic wave, if necessary, and the transponder transmits an electromagnetic wave in response; and (c) the responding electromagnetic wave transmitted by the transponder is received and evaluated by the interrogator such that, if a predeterminable transponder response code is present, the associated target to be identified is classified as a friendly target, (d) the interrogator transmits the querying electromagnetic wave in the millimeter-wavelength range, with a predeterminable, average wavelength, a predeterminable directional characteristic, a predeterminable maximum range and a predeterminable coding, directly to the target to be identified;

(e) the querying electromagnetic wave is received by the transponder by means of a receiving antenna essentially having a non-directional receiving characteristic, and the responding electromagnetic wave is then transmitted essentially non-directionally, and lies in the same millimeter-wavelength range as the querying electromagnetic wave;

(f) the responding electromagnetic wave transmitted by the transponder is received by the interrogator by means of a receiving antenna that is directed at the target to be identified and has a predeterminable directional receiving characteristic;

(g) in the interrogator, the received responding electromagnetic wave is supplied to a first mixer by way of a first limiter, a low-noise preamplifier and a second limiter, then converted by the first mixer and a signal generated by a local oscillator, with a predeterminable frequency, into a predeterminable intermediate-frequency range, and demodulated in a quadrature demodulator after a predeterminable low-pass filtering, resulting in orthogonal signals in the video range;

(h) the orthogonal signals are converted into an analog signal by means of a matched filter matched to the coding of the responding wave, and subsequently converted into a digital signal by an analog/digital converter; and (i) the digital signal is decoded by at least a decoder and a controller and evaluated such that it is possible to identify a target as a friend or foe based on the coding.

2. The method of identifying a target as a friend or foe as defined in claim 1, wherein the amplitude of the received signal is limited in the first limiter by a circuit comprising passive components.

3. The method of identifying a target as a friend or foe as defined in claim 1, wherein a predeterminable number of channels connected in parallel is used in the second limiter;

in each of the channels, the amplitude and the frequency band of the signals to pass through are subjected to a predeterminable limiting; and the number of channels and the limiting to be performed in each channel are selected as a function of the selected coding such that undesired received interfering signals are suppressed to the greatest extent.

4. The method of identifying a target as a friend or foe, as defined in claim 1, wherein to suppress self-poling, the signal generated by the oscillator needed for generating the querying wave, and the signal generated by the local oscillator, are mixed in a second mixer, then filtered in a further low-pass filter and applied to an input of a demodulator;

the intermediate-frequency signal generated by the first mixer is applied to the other input of the demodulator; and the output signal generated by the demodulator is checked by the matched filter and the evaluation circuit downstream thereof for the presence of a coding to be allocated to the query signal.

5. In an arrangement identifying a target as a friend or foe, in which an interrogator for transmitting a querying electromagnetic wave to a target to be identified; provided that the target to be identified possesses a transponder matched to the querying electromagnetic wave, the target receives the querying electromagnetic wave, if needed, and the transponder transmits a responding electromagnetic wave; and the responding electromagnetic wave transmitted by the transponder is received and evaluated by the interrogator such that, if a predeterminable transponder response code is present, the associated target to be identified is classified as a friendly target, the improvement that essentially the same electronic assemblies are provided in the interrogator and the transponder except that said interrogator comprises a directional transmitting/receiving antenna, and said the transponder comprises an omnidirectional transmitting/receiving antenna; the improvement further comprises a controller in said transponder, said controller being configured so as to prevent a query mode.

6. An arrangement for realizing a method for identifying a target as a friend or foe, wherein a querying electromagnetic wave is transmitted by an interrogator to a target to be identified, provided the target has a transponder matched to the querying electromagnetic wave, the querying electromagnetic wave is received by the target to be identified, if necessary and the transponder then transmits an electromagnetic wave in response, and the responding electromagnetic wave from the transponder is received by the interrogator and is evaluated, such that if a predeterminable transponder response code is available, the associated target to be identified is classified as a friendly target; and wherein:

the interrogator and the transponder contain essentially the same electronic components; the interrogator comprises means for transmitting an interrogating electromagnetic wave, a first limiter (BE1), a low noise pre-amplifier (LNA), a second limiter (BE2), by way of which the received, responding electromagnetic wave is conducted to a first mixer (M1) that generates an output signal with a predeterminable frequency in a predeterminable intermediate frequency range, a low pass filter (ZFTP) in which the output signal of the first mixer is filtered and is then demodulated in a quadrature demodulator (DEM) so that orthogonal signals are generated in the video range, a matched filter (MF) that converts the orthogonal signals to an analog signal that is matched to the coding used for the responding wave, an analog/digital converter (A/D) that subsequently converts the analog signal to a digital signal, a decoder (Dec) that decodes the digital signal, and a controller (Con), wherein the decoded digital signal is evaluated such that a friend-foe identification is made possible with the aid of the coding;

the interrogator and the transponder differ only in that the interrogator comprises a transmitting/receiving directional antenna whereas the transponder comprises a transmitting/receiving omnidirectional antenna and the controller (Con) for the transponder is designed such that a querying mode by the transponder is prevented.

* * * * *